(12) United States Patent
Pepper et al.

(10) Patent No.: US 7,654,193 B2
(45) Date of Patent: Feb. 2, 2010

(54) DRIP COFFEE MAKER WHICH DOES NOT REQUIRE ELECTRICITY TO OPERATE

(76) Inventors: William J. Pepper, 2171 W. Williams Ave. 28, Fallon, NV (US) 89406; Eileen Dubreuil, 2171 W. Williams Ave. 28, Fallon, NV (US) 89406

( * ) Notice: Subject to any disclaimer, the term of this patent is extended or adjusted under 35 U.S.C. 154(b) by 28 days.

(21) Appl. No.: 11/593,212

(22) Filed: Nov. 6, 2006

(65) Prior Publication Data

US 2007/0131121 A1 Jun. 14, 2007

Related U.S. Application Data

(60) Provisional application No. 60/749,836, filed on Dec. 13, 2005.

(51) Int. Cl.
*A47J 31/00* (2006.01)
(52) U.S. Cl. ............... 99/292; 99/295; 99/306
(58) Field of Classification Search ............. 99/275, 99/483, 279–323, 495, 509–513; 426/433, 426/597
See application file for complete search history.

(56) References Cited

U.S. PATENT DOCUMENTS

| 385,880 | A | * | 7/1888 | Racer | 99/306 |
|---|---|---|---|---|---|
| 2,227,540 | A | * | 1/1941 | Fry | 99/292 |
| 2,462,349 | A | * | 2/1949 | Battilani | 99/292 |
| 2,682,601 | A | | 6/1954 | Andres et al. | |
| 2,746,376 | A | * | 5/1956 | Hiscock | 99/295 |
| 2,829,584 | A | * | 4/1958 | Jepson | 99/292 |
| 4,150,608 | A | | 4/1979 | Hirschberg et al. | |
| 4,473,003 | A | | 9/1984 | Stone, Jr. | |
| 4,704,954 | A | | 11/1987 | Mollenhoff | |
| D342,414 | S | | 12/1993 | Jorgensen | |
| D343,333 | S | | 1/1994 | Jorgensen | |
| 5,678,472 | A | * | 10/1997 | Millman | 99/279 |

* cited by examiner

*Primary Examiner*—Timothy F. Simone
(74) *Attorney, Agent, or Firm*—James Ray & Assoc.

(57) ABSTRACT

A non-electric drip style coffee maker including a pot member having each of a handle member and a pouring spout. A basket like member for holding a filter having ground coffee disposed therein. Such basket like member includes at least one aperture formed through a bottom surface thereof for allowing freshly brewed coffee to pass therethrough and into such pot member. A generally hollow hot water reservoir having apertures formed through a bottom surface thereof and a predetermined diameter opening adjacent a top thereof is provided. There is a lid member having a predetermined size which will enable such lid member to cover both the opening in such hot water reservoir and the opening in such pot member. The lid member includes a grip member connected to an outer surface thereof for ease of placing and removing such lid.

12 Claims, 1 Drawing Sheet

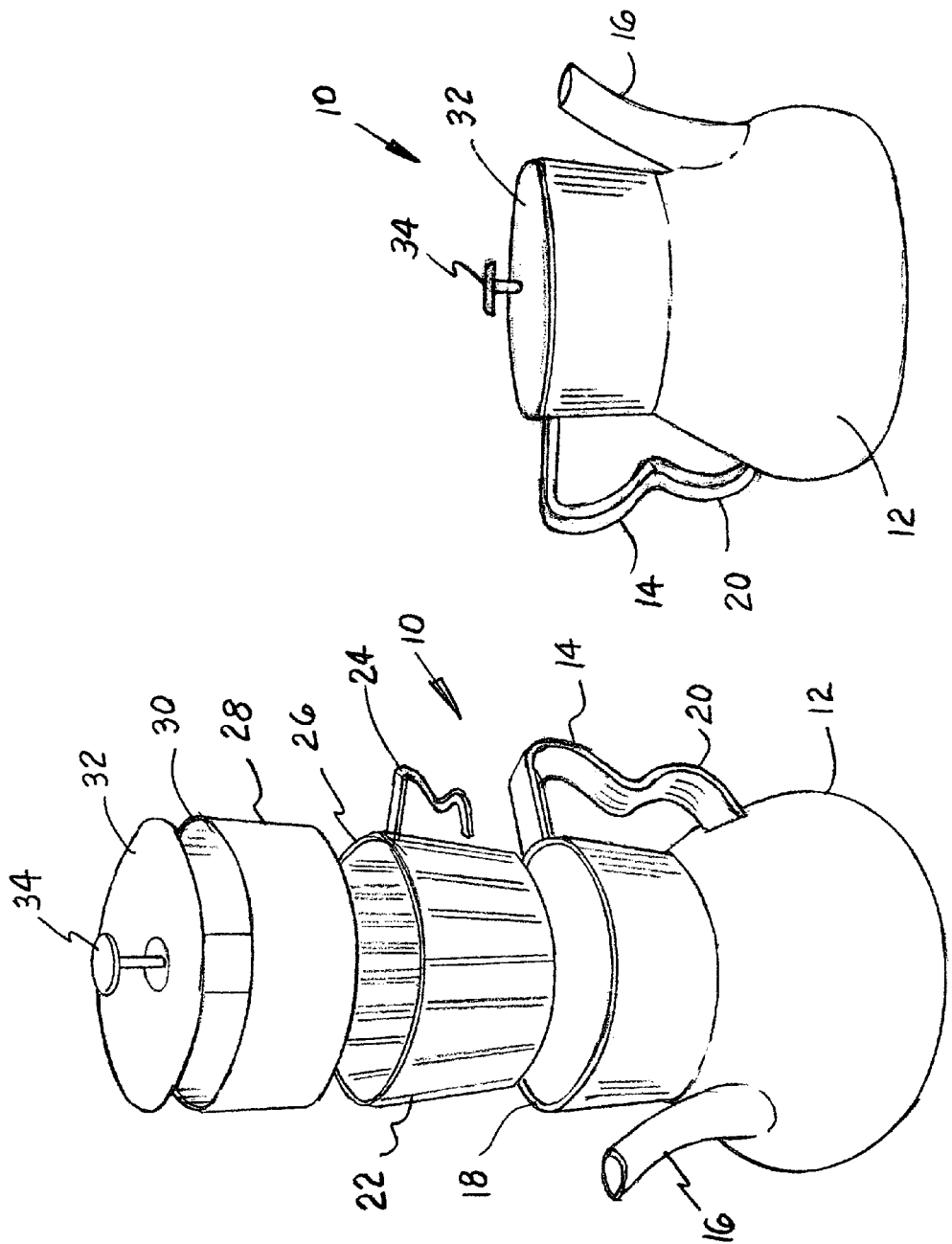

DRIP COFFEE MAKER WHICH DOES NOT REQUIRE ELECTRICITY TO OPERATE

CROSS-REFERENCE TO RELATED APPLICATION

This patent application relates to and claims priority from U.S. Provisional Patent Application Ser. No. 60/749,836 filed Dec. 13, 2005.

FIELD OF THE INVENTION

This invention relates to drip style coffee makers and, more particularly, the present invention relates to a drip style coffee maker which does not require any external power to brew a pot of drip coffee.

BACKGROUND OF THE INVENTION

As is generally well recognized in the art, many people enjoy a cup of freshly brewed drip style coffee. The majority of the prior art type drip style coffee makers, which are known to applicants and which are commercially available at the present time, require the use of electrical power to provide sufficient heat to brew such coffee.

Examples of such prior art type electric drip type coffee makers can be found in U.S. Pat. No. 2,682,601 which includes a heating unit disposed between the coffee receptacle and the water reservoir.

U.S. Pat. No. 4,473,003 teaches a drip style coffee maker having a preheated chamber containing a sufficient amount of water to brew the coffee prior to adding additional cold water to be heated for the next pot. this coffee maker requires the use of electricity to heat the water.

Another electrically operated drip coffee maker is taught in U.S. Pat. No. 4,704,954 which also requires the use of electricity even though it is taught to be used for travel.

Such electricity is not always available in many instances such as at a camp fire, in certain recreational vehicles not equipped with a generator, while boating and/or picnicking. Furthermore, there are times when a power outage may occur, for a variety of reasons, and the prior art type drip coffee makers will not be operable.

SUMMARY OF THE INVENTION

The present invention provides a drip style coffee maker for making a pot of coffee which does not require the use of electrical power. Such drip style coffee maker includes a pot member having each of a predetermined size body portion, a predetermined size opening formed adjacent a top thereof and a predetermined shape. The pot member being formed from a predetermined material. Such pot member includes a handle member formed from at least one predetermined material and attached to an outer surface of the pot member at a predetermined position thereon. Such pot member further has a pouring spout disposed on a radially opposed side of such pot member. There is a basket like member, having each of a predetermined size, a predetermined shape and a predetermined depth for holding a filter having ground coffee disposed therein. A bottom wall of such basket like member engageable, during a brewing cycle, with the top of such pot member. The basket like member includes at least one aperture formed through a bottom wall thereof for allowing freshly brewed coffee to pass therethrough and into such pot member and being open adjacent a top surface thereof. A generally hollow hot water reservoir having each of a predetermined number of apertures formed through a bottom wall thereof and a predetermined diameter opening adjacent a top thereof engages the basket like member adjacent a top thereof. Such apertures have each of a predetermined size, a predetermined shape and are arranged in a predetermined pattern which will ensure hot water contacting such ground coffee contained within such filter in such basket like member. The bottom surface of such hot water reservoir is sized to engage in the opening adjacent such top of the basket like member. A lid member having a predetermined size is provided which will enable such lid member to cover both such opening in the hot water reservoir and such opening in the pot member. The lid member including a grip member connected to an outer surface thereof for ease of placing and removing such lid member as necessary.

OBJECTS OF THE INVENTION

It is, therefore, one of the primary objects of the present invention to provide a drip style coffee maker which can be used at a camp fire, in a recreational vehicle not equipped with an electrical generator and at an outdoor picnic and/or any other areas where electrical power is may not be available such as at a hunting lodge.

An additional object of the present invention is to provide a drip style coffee maker which can be used at home in the event of a power failure for some reason such as an electrical storm knocking out power lines.

Another object of the present invention is to provide a drip style coffee maker which does not require electrical power and which is rather easy to use.

Still another object of the present invention is to provide a drip style coffee maker which does not require electrical power and which is relatively inexpensive to produce.

Yet another object of the present invention is to provide a drip style coffee maker which does not require electrical power and which can be manufactured in a number of different sizes and shapes.

A further another object of the present invention is to provide a dip style coffee maker which does not require electrical power and can be manufactured from a number of different materials.

An additional object of the present invention is to provide a drip style coffee maker which can have a number of different finishes on the outer surfaces thereof.

A further object of the present invention is to provide a drip style coffee maker which is relatively easy to clean.

In addition to the several objects and advantages of the present invention which have been described with some degree of specificity above it should be noted that various additional objects and advantages of the present invention will become more readily apparent to those persons who are skilled in the relevant art from the following more detailed description of the invention, particularly, when such description is taken in conjunction with the attached drawing figures and with the appended claims.

BRIEF DESCRIPTION OF THE DRAWINGS

FIG. 1 is an exploded view showing each of the elements required by the presently preferred embodiment of the invention; and FIG. 2 is side elevation view of the coffee pot illustrated in FIG. 1 without the coffee brewing portion and showing the lid portion disposed on the coffee pot itself.

BRIEF DESCRIPTION OF A PRESENTLY PREFERRED AND VARIOUS ALTERNATIVE EMBODIMENTS OF THE INVENTION

Prior to proceeding to the more detailed description of the present invention it should be noted that identical components having identical functions have been identified with identical reference numerals throughout both of the views illustrated in the drawing figures for the sake of clarity and understanding of such invention.

Now refer, more particularly, to FIGS. 1 and 2 of the drawings. Illustrated therein is a presently preferred embodiment of a drip type coffee maker, generally designated 10, produced according to the instant invention. This drip type coffee maker 10 includes a pot member 12 having each of a handle member 14 attached to one side thereof a pouring spout 16 attached to a radially opposed side thereof and an opening 18, having a predetermined diameter, disposed on the top of such pot member 12. The pouring spout 16 is disposed below the opening 18.

Pot member 12 may be formed from a number of different metallic materials. Preferably, such pot member 12 will be formed from one of heat resistant plastic, copper, stainless steel and aluminum. Additionally, such pot member 12 may be formed in any predetermined size and shape.

It is within the scope of the present invention for the handle member 14 to include a wooden portion (not shown) and to include finger gripping portions 20. The handle member 14 may be attached to an outer surface on the side of the pot member 12 by any known method such as, for example only, brazing and adhesives.

Another essential element of the present invention is a basket like member 22 having a handle member 24 attached to an outer surface thereof. The basket like member 22 is provided to hold a filter 26, preferably a standard size filter, having coffee (not shown) disposed therein. Basket like member 22 includes at least one aperture (not shown) formed through a bottom surface thereof for allowing freshly brewed coffee to pass therethrough. The at least one aperture has a predetermined shape which is preferably generally round.

A further essential element of the present invention is a generally hollow hot water reservoir 28 disposed over such basket like member 22 and having each of a predetermined number of apertures formed through a bottom surface thereof and a predetermined diameter opening 30 adjacent the top thereof. Such apertures have a predetermined size and shape opening and are disposed in a predetermined pattern which will ensure the hot water contacting the ground coffee contained in the basket like member 22. In the presently preferred embodiment of the invention such predetermined shape will preferably be round.

There is a lid 32 having a predetermined size which will enable it to cover both the opening 30 in the hot water reservoir 28 and the opening 18 in the pot member 12. Such lid member 32 includes a grip member 34 for ease in placing the lid member 32 into the opening 30 and 18, respectively, formed in the hot water reservoir 28 and the pot member 12.

In the presently preferred embodiment of the invention the outer surface of each of said pot member, said basket like member, said hot water reservoir and said lid member is one of polished and provided with a matte like finish.

While both a presently preferred and various alternative embodiments of the invention have been described in sufficient detail above to enable those skilled in the art to make and use the same it is to be understood that various other modifications and adaptations of such invention can be made without departing from either the spirit of the invention or the scope of the appended claims.

We claim:
1. A nonelectric drip style coffee maker, said drip style coffee maker comprising:
   (a) a pot member having each of a predetermined size body portion, a predetermined size opening formed adjacent a top thereof and a predetermined shape, said pot member being formed from a predetermined material, said pot member including;
      (i) a handle member formed from at least one predetermined material and attached to an outer surface of said pot member at a predetermined position thereon; and
      (ii) a pouring spout disposed on a radially opposed side of said pot member below said predetermined size opening formed adjacent a top of said pot member;
   (b) an open top basket member, having each of a predetermined size, a predetermined shape and a predetermined depth for holding a filter having ground coffee disposed therein, a bottom of said basket member engageable, during a brewing cycle, with said top of said pot member, said basket member includes at least one aperture having a predetermined shape formed through a bottom surface thereof for allowing freshly brewed coffee to pass therethrough and into said pot member and being open adjacent a top surface thereof;
   (c) a generally hollow hot water reservoir having each of a predetermined number of apertures formed through a bottom surface thereof and a predetermined diameter opening adjacent a top thereof substantially identical to said predetermined size opening formed adjacent a top of said pot member, said apertures having each of a predetermined size, a predetermined shape and arranged in a predetermined pattern which will ensure hot water contacting such ground coffee contained within such filter in said basket member, said bottom surface of said hot water reservoir sized to engage in said opening adjacent said top of said basket member; and
   (e) a lid member having a predetermined size which will enable said lid member to cover both said opening in said hot water reservoir and said opening in said pot member, said lid including a grip member connected to an outer surface thereof for ease of placing and removing said lid.

2. A nonelectric drip style coffee maker, according to claim 1, wherein said predetermined material said pot member is formed from is selected from the group consisting of heat resistant plastic, copper, stainless steel and aluminum.

3. A nonelectric drip style coffee maker, according to claim 2, wherein said predetermined material said pot member is formed from is aluminum.

4. A nonelectric drip style coffee maker, according to claim 1, wherein said handle member disposed on said pot member includes at least a portion thereof formed from wood.

5. A nonelectric drip style coffee maker, according to claim 4, wherein said handle member disposed on said pot member includes a predetermined plurality of gripping portions.

6. A nonelectric drip style coffee maker, according to claim 1, wherein said basket member further includes a predetermined plurality of rib portions disposed on an inner and outer surface thereof to aid in fluid flow.

7. A nonelectric drip style coffee maker, according to claim 1, wherein said basket member further includes a handle member disposed on an outer surface thereof.

8. A nonelectric drip style coffee maker, according to claim 1, wherein said predetermined shape of said basket member is generally round.

9. A nonelectric drip style coffee maker, according to claim 1, wherein said predetermined shape of said apertures formed through said bottom of said hot water reservoir is generally round.

10. A nonelectric drip style coffee maker, according to claim 1, wherein said gripping member disposed on said lid is generally round.

11. A nonelectric drip style coffee maker, according to claim 1, wherein each of said pot member, said basket member, said hot water reservoir and said lid member are formed from identical materials.

12. A nonelectric drip style coffee maker, according to claim 1, wherein an outer surface of each of said pot member, said basket member, said hot water reservoir and said lid member is one of polished and provided with a matte like finish.

\* \* \* \* \*